Dec. 12, 1933.   W. B. THIEMANN   1,939,472
GUIDE ATTACHMENT FOR TRACTORS
Filed Aug. 11, 1930

Inventor
William B. Thiemann
by Craig & Hague Attys

Patented Dec. 12, 1933

1,939,472

UNITED STATES PATENT OFFICE 1,939,472

GUIDE ATTACHMENT FOR TRACTORS

William B. Thiemann, Albert City, Iowa

Application August 11, 1930. Serial No. 474,558

12 Claims. (Cl. 97—49)

The object of my invention is to provide an auxiliary guide attachment adapted to be connected to a tractor frame, and when so connected may be used in connection with the regular steering mechanism, whereby the tractor may be automatically guided while the tractor is being used for plowing purposes by having a suitable guide device make engagement with the landside of the furrow being filled by the plow, to thereby provide means whereby the tractor may be more easily guided, and whereby the proper width of the land cut by the plow share may be more accurately maintained.

A further object is to provide in that type of tractor guide employing a guide arm having a runner adapted to follow the furrow, improved means for mounting the guide arm whereby the tendency of the tractor to be steered into the plowed ground on account of the resistance offered to the guide arm by frictional contact with the ground is overcome.

A further object is to provide in a tractor guide of that type employing a guide arm having a runner for operating in the furrow improved means for elevating and lowering the guide arm.

A further object is to provide in a tractor guide attachment, having a pivoted guide arm provided with a runner for operating in a furrow for guiding the tractor, and provided with yieldable means for retaining the runner against the land side of the furrow, and for steering the tractor inwardly, improved means for elevating and lowering the free end of the guide arm and for applying spring pressure as the said arm is lowered, and for relieving said pressure as the said arm is elevated.

My invention consists in the construction, arrangement and combination of the various parts of the device, whereby the objects contemplated are attained, as hereinafter more fully set forth, pointed out in my claims, and illustrated in the accompanying drawing, in which:

Figure 1:
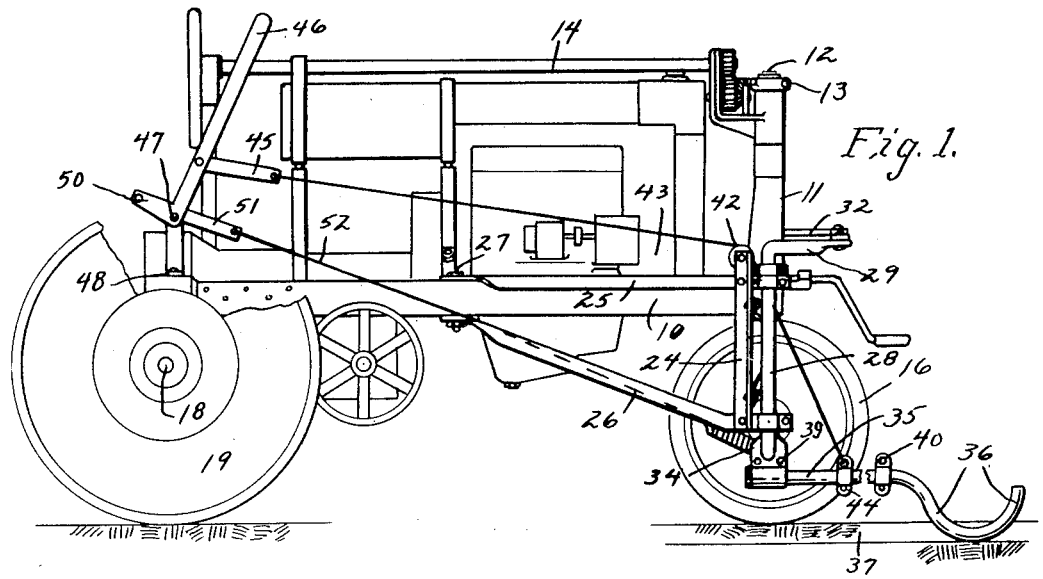
Figure 1 is a side elevation of a tractor showing the manner in which my improved guide attachment is connected thereto.
Figure 2:
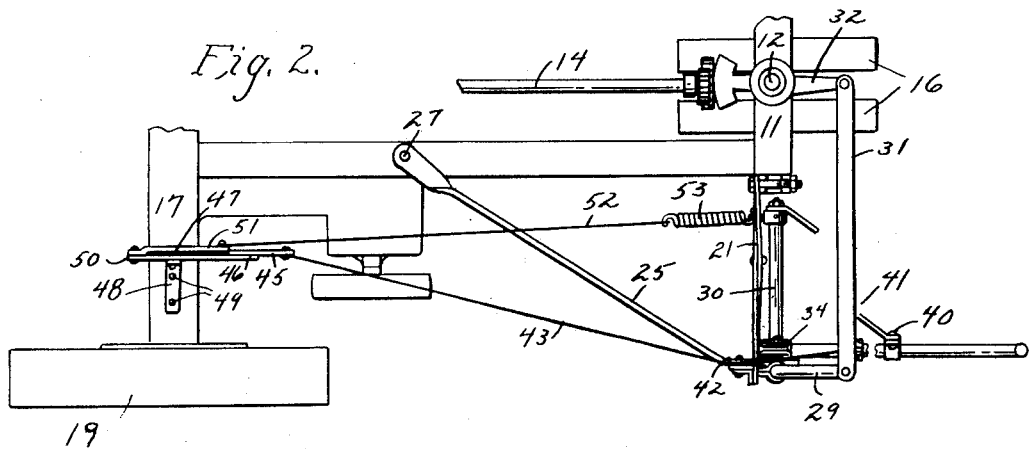
Figure 2 is a plan view of my improved attachment and a segmental portion of said tractor.
Figure 3:
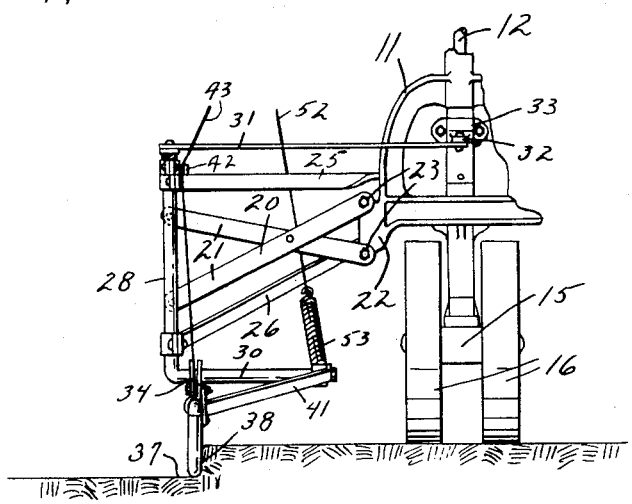
Figure 3 is a front elevation of the same.

The numeral 10 indicates a tractor frame, the forward end of which is provided with a bracket 11, in which is pivotally mounted a vertical steering shaft 12. The upper end of the shaft 12 is provided with suitable gear devices 13 operated by a steering shaft 14, in the usual manner. The lower end of the shaft 12 is provided with an axle 15 on which is supported the front tractor wheel 16. Rotation of the shaft 12 causes the axle 15 to be moved to a steering angle.

The rear end of the frame 10 is provided with an axle housing 17 carrying axles 18 provided with suitable traction wheels 19. When the tractor is used for plowing purposes, the right hand traction wheel 19 is usually operated in the furrow. A considerable difficulty has been experienced in driving the tractor while plowing in order to keep the front wheels the proper distance from the land side of the furrow, so that the proper width of cut may be constantly maintained, and constant attention has been required by the operator in order to accomplish this result.

I have, therefore, provided an auxiliary guide attachment, which assists the operator in properly guiding the tractor.

My improved guide device comprises a bracket 20, preferably formed of a pair of bars 21 supported in a diagonal manner, one relative to the other, and having their inner ends connected to a bracket 22 carried by the tractor frame by means of suitable bolts 23. Said bracket 20 is projected laterally from the side of the tractor frame and from a point near the forward end of said frame.

The outer ends of the members 21 are connected to an upright frame member 24, provided with rearwardly extending brace members 25 and 26. The rear ends of said brace members are connected to one of the frame members 10 by means of a suitable bolt 27 carried by said frame member.

The forward ends of the members 25 and 26 project forwardly beyond the frame member 24 a slight distance and have rotatively mounted therein a vertical shaft 28. The upper end of the shaft 28 is provided with a horizontally and forwardly extending portion 29, while the lower end of the shaft 28 is provided with a horizontally and inwardly extending portion 30.

The free end of the member 29 is pivotally connected to one end of a link 31, which in turn is pivotally connected to the forward end of an arm 32. Said arm 32 is connected to the steering shaft 12 by means of a clamp 33. The link 31 and the arm 32 provide means whereby the said shaft 12 may be steered by moving the link 31 longitudinally and by rotating the shaft 28.

The bracket 20 is of such length that the vertical pivot center of the shaft 28 will project into the furrow.

Pivotally connected to the inner end of the portion 30 is a bracket 34 designed to support the rear end of a horizontally arranged guide arm 35. The forward end of said guide arm is provided with a runner portion 36 which consists preferably in bending the forward end of the arm 35 downwardly and thence upwardly in the manner clearly illustrated. The runner portion 36 is designed to be supported in the furrow 37 with the inner face of the runner 36 adjacent to the land side 38, while the arm 35 is supported in a plane substantially parallel with said furrow, while the device is being operated under normal steering conditions.

The rear end of the arm 35 is adjustably connected to the bracket 34 by being inserted between said bracket plates. Said plates are clamped to said arm by means of bolts 39. Thus means is provided whereby said guide arm 35 may be rotated about its longitudinal axis to vary the inclination of the runner 36, to increase or decrease the tendency of the runner to hug the land side 38.

The arm 35 is provided with a clamp 40 to which one end of a brace 41 is connected. The other end of said brace is pivotally connected to the inner end of the shaft 30. The clamp 40 also provides means for permitting rotation of the arm 35, as well as means for varying the lateral angular position of the arm 35 relative to the land side 38.

On account of the bracket 34 being pivoted to the portion 30, as well as to the inner end of the brace 41, it will be seen that the free end of the arm 35 is free to swing upwardly and downwardly. It will further be seen that any inward and outward movement of the free end of said arm will cause the shaft 28 to be rocked and the wheels 16 steered by the shaft 12.

The upper end of the bar 24 is provided with a pulley 42 designed to support a cable 43, one end of which is connected to the arm 35 by means of a clamp 44, while the other end of the cable 43 extends rearwardly and is connected to a link 45, one end of which is connected to a lever 46 at a point above its pivot 47. The pivot is supported by means of a suitable bracket 48 secured to the upper surface of the axle housing 17 by means of suitable bolts 49.

The lower end of the lever 46 is provided with a rearwardly extending arm 50, the free end of which is pivotally connected to one end of a link 51, to which a cable 52 is connected. The forward end of the cable 52 is provided with a spring 53 having one end connected to the inner end of the shaft portion 30, with the spring under considerable tension when the lever 46 is at its forward position of movement, as shown in Figure 1. Said spring provides means whereby the inner end of the portion 30 has a tendency to move rearwardly, causing the runner 36 to engage the land side 38 and a tendency toward the tractor to be steered inwardly from the furrow.

By this arrangement the said runner 36 will follow the contour of the land side 38 as the tractor is advanced, and the steering of the front wheels of the tractor accomplished. The tractor is steered inwardly by the spring and outwardly by the outward movement of the arm 35. When the tractor has reached the end of the furrow, the upper end of the lever 46 is moved rearwardly, causing tension to be applied to the cable 43 and the arm 35 to be elevated.

The rearward movement of the lever 46 will also cause the rear end of the arm 50 to be lowered, and then moved forwardly, causing the link 51 to be moved downwardly below the pivot center 47, at which time the tension of the spring assists in the elevation of the arm 35.

Further rearward movement of the lever 46 will cause the tension of the spring 53 to be released from the arm 30. The tractor may then be steered by the shaft 14 in the usual manner without any interference or resistance from the spring 53.

By mounting the vertical shaft 28 immediately above the furrow and in direct longitudinal alinement with the arm 35, I have provided means whereby any tendency toward rearward longitudinal movement of the arm 35 will be carried by the bracket 20 and the brace arms 25 and 26, without effecting the lateral angular movement of said arm 35 in either direction, or without effecting the steering action of the wheel 16, as has heretofore been the difficulty with steering arms connected directly to the steering mechanism of the tractor.

I have thereby eliminated the tendency of the tractor to run into the plowed ground, other than imparted to the steering mechanism by outward lateral movement of the forward end of the steering arm.

I claim as my invention:

1. In combination, a tractor having steering wheels adapted to travel a predetermined distance from a furrow, a supporting bracket projecting laterally from said tractor frame, a vertical pivot member carried by said frame, a guide arm projecting horizontally and forwardly from said pivot member, means for operatively connecting said guide arm with said steering wheels, whereby lateral swinging movement of the free end of said arm will cause said tractor to be steered, the forward end of said arm being provided with a runner for traveling in said furrow, yieldable means for causing the forward end of said arm to hug the land side of said furrow, means for pivoting said arm whereby its free end may be elevated and lowered, and a lever device for raising and lowering said arm.

2. In combination, a tractor having steering wheels adapted to travel a predetermined distance from a furrow, a supporting bracket projecting laterally from said tractor frame, a vertical pivot member carried by said frame, a guide arm projecting horizontally and forwardly from said pivot member, means for operatively connecting said guide arm with said steering wheels, whereby lateral swinging movement of the free end of said arm will cause said tractor to be steered, the forward end of said arm being provided with a runner for traveling in said furrow, yieldable means for causing the forward end of said arm to hug the land side of said furrow, means for pivoting said arm whereby its free end may be elevated and lowered, and a lever device for raising and lowering said arm, said lever device being adapted to apply tension to said yieldable means when the arm is in a lowered position, and to release tension on said yieldable means when the arm is in an elevated position.

3. A guide device for tractors, comprising a horizontally arranged arm, means for pivotally supporting the rear end of said arm whereby its free end may be swung horizontally or vertically, means for operatively connecting the said arm with the steering mechanism of a tractor, whereby horizontal swinging movement of said arm will cause said tractor to be steered, yieldable means for imparting inward pressure to the forward end of said steering arm, and a lever device for elevating and lowering the free end of said arm, and for releasing said spring tension as the arm is elevated, and for increasing said spring tension as said arm is lowered.

4. A guide device for tractors, comprising a bracket adapted to project laterally from a tractor frame, a vertical pivot member carried by said bracket, a guide arm projecting forwardly from the lower end of said pivot member, means for operatively connecting said guide arm with the steering mechanism of a tractor, whereby lateral swinging movement of the forward end of said arm will cause said tractor to be steered, and yieldable means for imparting inward pressure to the forward end of the said steering arm.

5. A guide device for tractors, comprising a bracket adapted to project laterally from a tractor frame, a vertical pivot member carried by said frame, a guide arm projecting forwardly from the lower end of said pivot member, means for operatively connecting said guide arm with the steering mechanism of a tractor, whereby lateral swinging movement of the forward end of said arm will cause said tractor to be steered, yieldable means for imparting inward pressure to the forward end of the said steering arm, a lever, a bracket for pivotally supporting said lever to a tractor frame, a cable connecting said lever with said arm, whereby movement of said lever will cause the forward end of said arm to be elevated and lowered, means for operatively connecting said yieldable means with said lever, whereby swinging movement of said lever will cause the tension of said yieldable means to be released as said arm is elevated, and the tension of said yieldable means to be increased as the forward end of said arm is lowered.

6. A guide device for tractors comprising a bracket adapted to project laterally from a tractor frame, a guide arm projecting forwardly from the outer end of said bracket for steering a tractor, means for pivoting the rear end of said guide arm to said bracket to permit its forward end to swing vertically and horizontally, yieldable means for imparting inward pressure to the forward end of said guide arm, and a lever device for increasing and decreasing the tension of said yieldable means.

7. A guide device for tractors designed to be supported longitudinally of the advance of the tractor, a guide arm, means for pivoting one end of said guide arm to a tractor frame to permit its opposite end to swing vertically and horizontally, yieldable means for imparting inward pressure to the forward end of said guide arm, a hand actuated lever device for increasing or decreasing the tension of said yieldable means, and means for operatively connecting said guide arm to the steering mechanism of a tractor whereby lateral and horizontal movement of the free end of said guide arm will steer the tractor.

8. A guide for tractors comprising a bracket adapted to project laterally from the forward end of the tractor frame, a guide arm supported forwardly of the outer end of said bracket and longitudinally of the advance of said tractor, means for pivotally connecting the rear end of said arm to said bracket to permit its forward end to swing vertically and laterally, and means for operatively connecting said guide arm with the steering mechanism of a tractor whereby lateral swinging movement of the forward end of said guide arm will cause the tractor to be steered.

9. The combination of a tractor having a steering mechanism, a guide arm, means for operatively connecting said guide arm to the steering mechanism of the tractor whereby lateral swinging movement of one end of said guide arm will cause the tractor to be steered, yieldable means for imparting inward pressure to the movable end of said guide arm, and a hand actuated lever device for increasing or decreasing the tension of said yieldable means.

10. A guide for tractors comprising a bracket adapted to be attached to a tractor frame and having one end projecting laterally from one side of said frame, a guide arm having one end pivoted to the outer end of said bracket and its opposite end extended forwardly and designed to engage the land side of a furrow, yieldable means carried by the tractor frame for imparting inward pressure to the movable end of said guide arm, and means attached to said arm back of its forward end for operatively connecting said arm to the steering mechanism of a tractor.

11. A guide for tractors comprising a bracket adapted to be attached to a tractor frame and having one end projected laterally from one side of said frame, a guide arm having one end pivoted to the outer end of said bracket and its opposite end extended forwardly thereof and designed to engage the land side of a furrow, means attached to said arm back of its forward end for operatively connecting said arm to the steering mechanism of a tractor.

12. The combination of a tractor having a steering mechanism, a guide arm, means for operatively connecting said guide arm to the steering mechanism of the tractor, whereby lateral swinging movement of one end of said guide arm will cause the tractor to be steered, yieldable means for imparting inward pressure to the movable end of said guide arm, and a lever device operatively connected to said arm for elevating and lowering said arm, means actuated by said lever for releasing said spring tension as the arm is elevated and for increasing said spring tension as said arm is lowered.

WILLIAM B. THIEMANN.